The United States of America. 1334X

July 7, 1810

To all to whom these Letters Patent shall come:

Whereas Benjamin Parry a Citizen of the United States, hath alleged that he has invented a new and useful improvement being a Machine for drying Corn & Grain of all kinds, and also for drying Malt, meal, & other Substances which improvement he states has not been known or used before his application; has affirmed that he does verily believe that he is the true inventor or discoverer of the said improvement, has paid into the treasury of the United States, the sum of thirty dollars, delivered a receipt for the same, and presented a petition to the Secretary of State, signifying a desire of obtaining an exclusive property in the said improvement, and praying that a patent may be granted for that purpose: These are therefore to grant, according to law, to the said Benjamin Parry his heirs, administrators, [illegible] for the term of fourteen years from the seventh day of July 1810 [illegible] and using, and vending to others to be used, the said improvement, a description whereof is given in the words of the said Benjamin Parry himself, in the schedule hereto annexed, and is made a part of these presents.

In testimony whereof, I have caused these Letters to be made Patent, and the Seal of the United States to be hereunto affixed.

GIVEN under my hand, at the City of Washington, this seventh day of July in the year of our Lord, one thousand eight hundred and ten, and of the independence of the United States of America, the thirty fifth.

James Madison

BY THE PRESIDENT.

R Smith
Secretary of State.

City of Washington, To wit:

I DO HEREBY CERTIFY, That the foregoing Letters Patent were delivered to me on the seventh day of July in the year of our Lord, one thousand eight hundred and ten to be examined; that I have examined the same, and find them conformable to law; and I do hereby return the same to the Secretary of State, within fifteen days from the date aforesaid, to wit:—On this seventh day of July in the year aforesaid.

C. A. Rodney
Attorney General of the United States.

1334X

The Schedule referred to in these Letters Patent and making part of the same containing a description in the words of the said Benja
min Barry himself of his Machine for drying Corn and Grain of all kinds, and
also for drying Malt, meal, and other substances This Machine is intended for the use of Flour, and Corn mills, and Breweries, and
may be erected within or attached thereto and the necessary motion communicated
either by the water or wind which turns the mills or otherwise according to Circumstances
in the [illegible] of the construction it may be considered as composed of the Casing or
[illegible] the Machinery for communicating motion the drying sieves, and the furnace
[illegible]

The Exterior case or inclosure of the drying apparatus of the Machine may
[illegible] walls of brick or Stone and [illegible] materials which shall confine
[illegible] little liable to accident from fire. Near the upper part of
[illegible] a long [illegible] is sus
[illegible]
[illegible] end of it projects beyond the outer wall, and from [illegible]
[illegible] malt or other substance [illegible] This Sieve is made
[illegible] metal, and perforated with [illegible] the free admission of heated
[illegible] chains by which it is hung [illegible] the sieve to have a [illegible]
[illegible] extends nearly the length [illegible] or drying Chamber
[illegible] descent from the End which [illegible] the grain to the upp
[illegible] The [illegible] after passing along this [illegible] sieve falls over the lower
[illegible] sieve which extends [illegible] the Chamber, and [illegible]
the grain to the [illegible] sieve which extends the [illegible] of the Chamber [illegible]
the first and [illegible] the dried grain at the [illegible] it is first received. This
Cross sieve is [illegible] with chains so as to [illegible] swinging motion, and has
a small descent [illegible] the lower end of the first long sieve to the upper end of the
long sieve by which the grain is returned. From the [illegible] end of the Cross sieve the
grain falls on the [illegible] sieve which has a [illegible] descent to where it [illegible]
the drying case [illegible] chamber, where it discharges the [illegible] grain. It hangs in [illegible]
so as to have a swinging Motion similar to the sieve first above described. Beneath
these sieves and [illegible] the Chamber or inclosure [illegible], in which ~~the sieves are~~
placed

1334X

[illegible] or stone, [illegible] metal [illegible] with metal or some other substance which will bear the action of fire; the fuel is intend[ed] [illegible] by an opening or door in one of the [illegible] walls of the chamber; and the smoke carried off by a flue or pipe with proper Dampers or registers for regulating the heat.

On the outside of the case or walls which enclose the drying [illegible] horizontal shaft which receives a rotary motion from [illegible] shaft has two projecting cams or teeth which by [illegible] from the ends of the long sieves give them [illegible] to [illegible] to progress along them. There is a small [illegible] on [illegible] wheel on one end of a shaft [illegible] through the drying chamber under the [illegible] near its opposite end gives [illegible] the grain from the lower end of [illegible] discharging sieve. In order to give a [illegible]

[illegible] produce this effect [illegible] may be [illegible] and so light [illegible]

[illegible] Benjamin Parry

[illegible]

1810

United States Patent to

Benjn Parry

July 7 - 1810

Recorded in the Office for Recording [illegible] in and for the City & County of Philada. in [illegible] Book No. 25 page [illegible] Witness my hand & [illegible] of Office this [illegible] day of March [illegible]

[illegible]